May 2, 1944. S. F. MONROE 2,347,749
PHOTOGRAPHIC APPARATUS
Filed Feb. 24, 1941 2 Sheets-Sheet 2
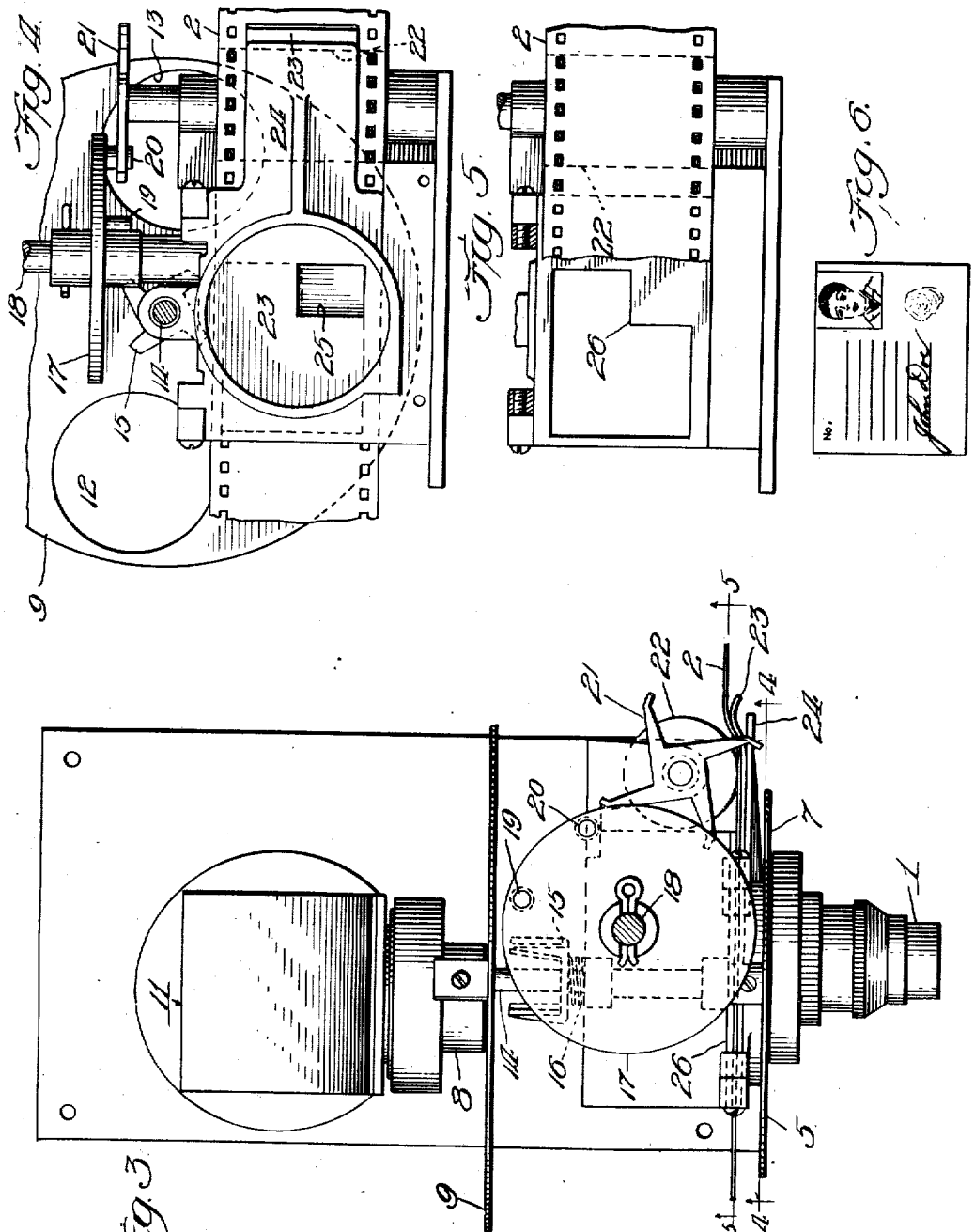

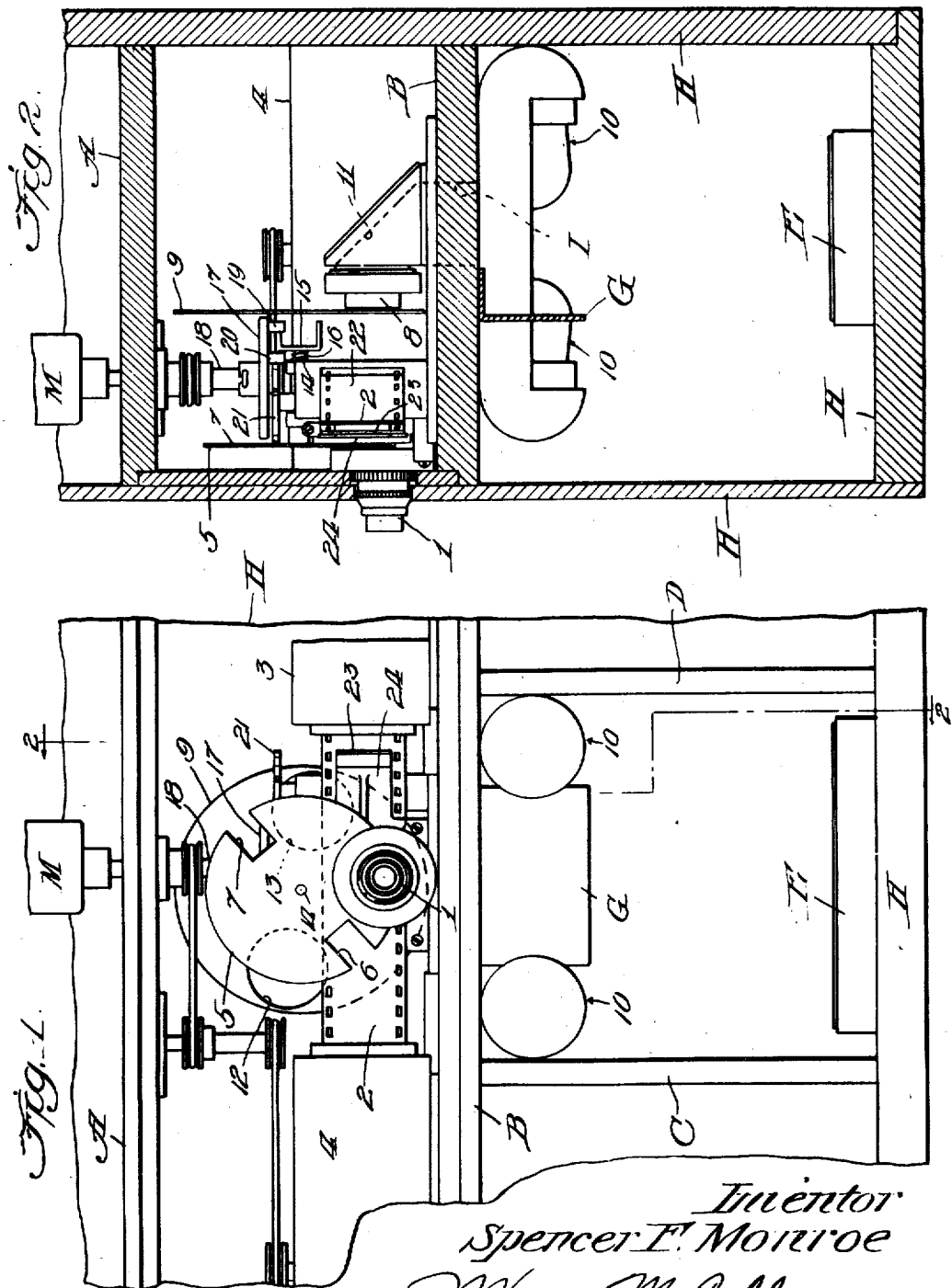

Patented May 2, 1944

2,347,749

UNITED STATES PATENT OFFICE 2,347,749

PHOTOGRAPHIC APPARATUS

Spencer F. Monroe, Chicago, Ill., assignor to Monroe Camera Corporation, Chicago, Ill., a corporation of Illinois Application February 24, 1941, Serial No. 380,243

1 Claim. (Cl. 88—18.3)

This invention relates to photographic apparatus which has been designed to produce a large number of negative photographs in a comparatively short space of time. The apparatus of the invention embodies some of the principles of the ordinary camera and the moving picture camera.

The object of the invention is to provide means for obtaining a large number of individual photographs in a relatively short time, which photographs may be developed in the usual manner, that is individually, or collectively as a part of a roll of film, thus minimizing the time required in taking the picture and developing the negatives thereof.

Another object of the invention is to take a large number or series of identifying photographs including, for example, a brief description of the individual photographed, his personal signature, and if desired, his fingerprint, and any other means of identification that might be wanted on the particular individual being photographed. Such a means of identification would have tremendous practical advantages to licensing bureaus, investigating groups, large industrial establishments, and at the present time as a means to prevent undesirable persons from gaining admittance to plants and offices engaged in the National defense program.

A further object of the invention is to provide a camera having a single chamber, which is capable of taking separate photographs on a sensitized strip of material so that when a print is made from the strip of sensitized material you have a composite of the separate photographs.

In a specific embodiment the invention comprises a photographic camera having a front lens operated by a front revolving shutter, a container for the unexposed photographically sensitized material, a container for collecting the exposed photographically sensitized material, means for causing the photographically sensitized material to pass from one container to the other behind the front lens and the front revolving shutter, means for blocking off all light rays from the photographically sensitive material excepting those passing through the front lens, another lens operated by another revolving shutter, means for blocking off all light rays from the photographically sensitive material coming into the front lens, a photographic chamber with means therein to hold an object to be photographed in a position so that light is reflected therefrom to a means for deflecting the reflected light rays into one of the lenses of the camera, and means operated by a motor for correlating the operation of the separate shutters and the means for advancing the sensitized film between the shutters and lenses.

The several features of the invention are shown in the accompanying drawings and a description of the invention will be better understood by reference to the several figures illustrated with identifying numerals, as described in the accompanying specification. In describing the apparatus of this invention the same numerals and letters are employed to designate corresponding elements in the several figures illustrated.

Figure 1 shows a front view of the portion of the camera containing all the component parts of this invention, with the front cover removed.

Figure 2 is a sectional view in elevation taken along the broken line 2—2 of Figure 1.

Figure 3 is a plan view of the central portion of the camera taken along a plane below the motivating means indicated as M in Figure 1.

Figure 4 is a sectional view in elevation taken along the line 4—4 of Figure 3.

Figure 5 is a sectional view in elevation taken along the line 5—5 of Figure 3.

Figure 6 is a representation of a composite photograph that might be produced by this camera shown in reversed relation to the blocked-off views of the film as shown in Figures 4 and 5.

Figure 1 shows the front of the housing H of the camera removed, whereas in Figure 2 portions of the front, back and bottom of the housing H are shown in place. In Figures 1 and 2 the means for actuating the moving parts of the apparatus is indicated by motor M. The upper compartment of the camera which contains the motivating means and attending apparatus, which is not part of this invention, is separated from the central compartment by shelf A, and the central compartment is separated from the lower compartment and photographic chamber by shelf B. The photographic chamber is a portion of the lower compartment closed in by walls C and D. A block E is centrally located on the bottom of the photographic chamber and mounts a metallic frame suitable for holding a piece of paper, cardboard, or a card, in place while the same is being photographed. The shield G cuts down the amount of light passing through opening I.

The primary object or person to be photographed is placed in front of lens 1 which may be manually adjusted for the desired focal distance. Light rays from the person or object being photographed pass through lens 1 to the sensitized surface of the photographic material 2 which is unwound from a roll or reel in case 3 and is wound on a roll or reel in case 4. However, circular shutter 5 interrupts the through passage of the light rays until notch 6 or 7 is rotated into a position directly behind lens 1. For the short time that either of the notches 6 and 7 passes directly behind lens 1, the person or object located in front of the camera and in line with lens 1 is being photographed on the film or other sensitized material 2 standing behind shutter 5 and directly behind lens 1.

The rear lens 8 of the camera is shown in Figure 2 immediately behind a rotary shutter 9. However, rear lens 8 is not directly behind front lens 1 which fact is illustrated in Figure 3. Neither are both lenses at the same horizontal level which fact is shown in Figure 2. The reason for this off center arrangement of lenses will be obvious to those skilled in the photographic art from a study of Figure 6 which illustrates the type of composite photograph this invention is designed to produce. The photograph of the person appearing in the upper right hand corner of Figure 6 was taken through front lens 1 on the side of the film exposed to the rays through the front lens. The photograph of the card of information, including his signature and thumb print, if desired, constituting the remainder of Figure 6, was taken through rear lens 8 on the side of the film 2 exposed to the rays through the rear lens.

A piece of paper or cardboard, or a special card having all the information desired written or printed legibly thereon is placed on block E with the face of the card up so as to be well lighted by a suitable source of light 10. One or more sources of light 10 may be arranged as desired in the photographic chambers so as to fully illuminate the face of the exposed card. Light rays from the card are reflected vertically through opening I in the top of the photographic chamber and are reflected by mirror 11 so as to pass through rear lens 8. The reflected and deflected light rays pass through lens 8 but are interrupted by circular shutter 9. As the shutter is rotated circular openings 12 and 13 pass in succession in front of lens 8. When either opening 12 or 13 is directly in front of lens 8, the light rays reflected from the card and deflected by the mirror impinge on the side of the film 2 exposed to the light rays from rear lens 8.

The shutter 5 for front lens 1 rotates at the same time and in the same direction as shutter 9 for rear lens 8. The shutters could be operated separately but synchronized so that notch 6 passes behind lens 1 just before circular opening 12 passes in front of lens 8, and likewise notch 7 just before circular opening 13. However, in the embodiment of the invention illustrated in the drawings the two shutters are joined in fixed relation to each other on the shaft 14. Also mounted on shaft 14 is a circular element 15 with prongs or fingers bent horizontally. A spring 16 tends to keep the shaft and the several elements in their proper positions by taking up any slack.

A horizontal disk 17 is keyed to shaft 18 which is connected to motivating means M. Two pins 19 and 20 are secured to disk 17 at predetermined points near its edge. These pins extend down from disk 17 and rotate with the disk in a counterclockwise direction. As pin 19 meets a finger of circular element 15 it imparts the counterclockwise rotation of disk 17 to the shaft 14. As disk 17 continues to revolve pin 19 disengages from the bent finger of element 15 after shaft 14 has rotated a certain amount and then shaft 14 stops turning. Disk 17 continues revolving, however, until pin 20 meets a bent finger of element 15 and again the revolving disk 17 causes the shaft 14 to rotate. After the shaft has turned part of a complete revolution pin 20 disengages the bent prong of element 15 and shaft 14 stops turning but disk 17 still continues to rotate by reason of connection to motor M or other actuating means used. Each time pin 19 or 20 engages the bent fingers of circular element 15 the shaft 14 is rotated through part of a revolution and simultaneously the shutters 5 and 9 which are secured to shaft 14 rotate a corresponding amount.

As disk 17 continues to revolve around on shaft 18 pins 19 and 20 will engage in turn extensions of star wheel 21 and rotate it a definite amount so long as the pins are in contact with the sprockets of the star wheel. When the pins of disk 17 are not in contact with the sprockets of the star wheel 21, the star wheel does not turn. Figure 4 shows pin 20 as it moves away from the sprocket of star wheel 21 for which reason the latter has stopped turning. Figure 4 also shows pin 19 in a position just before it engages the bent prong of circular element 15. Star wheel 21 is secured to a drum 22 which has two bands of regularly spaced teeth around it which engage the holes which line the two edges of film 2 at regular intervals. Thus the rotation of star wheel 21 revolves drum 22 and causes the film 2 to advance between the front and rear lenses of the camera.

Film 2, or any other photographically sensitive material which may be employed, by reason of the revolving drum 22 is unwound from a reel or drum enclosed in case 3, moved between the front and rear lenses of the camera simultaneously, and wound on to a reel or drum enclosed in case 4. The movement of the reel or drum in case 4 is also assisted by pulley arrangement to the means M used to rotate disk 17 shown in Figures 1 and 2. If desired the film need not be collected on a reel in case 4 but may be cut off and developed as individual pictures, or short strips of pictures.

At this point it will be clear to those skilled in the photographic art that an individual sitting in front of lens 1 will be photographed upside down on that portion of the photographically sensitized material which is exposed behind lens 1 by the notches 6 and 7 in shutter 5. So as to restrict the exposure to light rays coming through lens 1 and notches 6 or 7, a brass insert 23 is placed behind webbed plate 24 which blocks off the major portion of film 2 and only allows the light rays to pass through the rectangular cut out portion 25 in said insert 23 so as to impinge on the film behind. This means of blocking off most of the surface of the film and permitting the photographing of a person sitting in front of lens 1 on a relatively small corner of a section of the film is illustrated in Figure 4.

In order to block off light rays directed from a card, or any other subject of photography in the photographic chamber of the camera, through rear lens 8 upon the small corner of a section of the film, which already has the photograph of the person sitting in front of lens 1, another insert 26 is placed on the other side of film 2 as shown in Figure 3. Insert 26 is clearly shown in Figure 5 which view shows film 2 broken away so as to reveal the portion of the insert 26 which blocks off light from the lower right hand corner of a section of the film which already bears the imprint of the person sitting in front of the camera. The film or material which is photographically sensitive passes between inserts 23 and 26. The result of blocking off light rays coming through the rear lens 8 and taking a picture of the person in front of lens 1, and then taking a picture of the subject of photography in the photographic chamber of the camera while blocking off light rays coming through front lens 1, would be a composite photograph of both subjects of photography on the same film. An example of such a composite photograph is shown right side up in Figure 6, instead of inverted as it would be when the pictures were taken.

A special feature of this invention is the ability of the operator to take a picture of a person with the front lens, and a second or so later take a picture of any subject of photography that might be placed in the photographic chamber of the machine with the rear lens, and both pictures will be taken on the photographic film without any movement of the film between the taking of the two photographs. In such a case the front shutter is in approximately the relation shown in the drawings to the rear shutters.

The operator can adjust the front and rear shutters on shaft 14 so that the notches 6 and 7 in the front shutter 5 rotate past the front lens 1 at exactly the same time the circular openings 12 and 13 in rear shutter 9 rotate past the rear lens 8. In such a case the machine is capable of taking pictures with both the front and rear lenses simultaneously and without any movement of the photographic film.

When the subject of photography before the front lens is dark, that is, it does not reflect a lot of light which is supplied from other compartments of the machine not shown in the drawings, or the background is dark, or the light in the room is insufficient, the operator will adjust the front and rear shutters so that the circular openings in the rear shutter pass in front of the rear lens before the notches in the front shutter pass in the rear of the front lens. When that adjustment is made the circular openings in the rear shutter will rotate right on by the rear lens, whereas by reason of the location of pins 19 and 20 in cam disk 17 the notches in the front shutter will hesitate momentarily behind the front lens before rotating past. In that way there is a longer time of exposure for the subject of photography before the front lens which will tend to equalize the light intensities supplied to the film from the front and rear lenses.

In the majority of cases the light reflected from the subject of photography in the photographic chamber and then deflected to the rear lens will be less than the light reflected by the subject of photography before the front lens, for two reasons: (a) the light rays which are deflected by the mirror through the rear lens and then have to penetrate through the film to the side of the film which is photographically sensitized lose about thirty-seven per cent of their intensity; (b) the compartments of the camera which are not shown completely in Figures 1 and 2 of the drawings are utilized to house house lights with reflectors for flood lighting the subject of photography before the front lens. For those reasons the shutters are usually adjusted on the shaft as shown in the drawings in order to have the rear shutter pause momentarily in front of the rear lens so as to allow a briefly longer time of exposure to the light rays from the photographic chamber.

I claim the following:

In a photographic camera the combination of separate lenses with individual shutters for each lens, means for guiding photographically sensitive material between said lenses comprising thin strips of metal with portions cut out to permit the passage of light rays so as to impinge on opposite sides of said sensitive material, means for causing said sensitive material to move between said strips of metal, means for simultaneously operating said shutters and means for correlating the motion of said sensitive material and said shutters comprising a revolving disk with a plurality of pins extending down therefrom so as to engage successively said means for moving said material and said means for operating said shutters.

SPENCER F. MONROE.